United States Patent
Xu et al.

(10) Patent No.: US 11,109,450 B2
(45) Date of Patent: Aug. 31, 2021

(54) BASE STATION FUNCTION DEPLOYMENT METHOD AND DEVICE

(71) Applicant: Huawei Technologies Co., Ltd., Shenzhen (CN)

(72) Inventors: Haidong Xu, Shanghai (CN); Peng Lan, Shanghai (CN); Shenghua Bao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 42 days.

(21) Appl. No.: 16/593,780

(22) Filed: Oct. 4, 2019

(65) Prior Publication Data

US 2020/0037312 A1   Jan. 30, 2020

Related U.S. Application Data

(63) Continuation of application No. PCT/CN2017/079707, filed on Apr. 7, 2017.

(51) Int. Cl.
  *H04W 88/08* (2009.01)
  *H04W 76/27* (2018.01)
  (Continued)

(52) U.S. Cl.
  CPC ......... *H04W 88/085* (2013.01); *H04W 48/18* (2013.01); *H04W 72/0433* (2013.01); *H04W 76/27* (2018.02); *H04W 80/08* (2013.01)

(58) Field of Classification Search
  CPC .................. H04W 88/085; H04W 72/0433
  See application file for complete search history.

(56) References Cited

U.S. PATENT DOCUMENTS

| 2013/0136068 A1 | 5/2013 | Johansson et al. |
| 2014/0233378 A1 | 8/2014 | Jappila et al. |

(Continued)

FOREIGN PATENT DOCUMENTS

| CN | 101505500 A | 8/2009 |
| CN | 102547774 A | 7/2012 |

(Continued)

OTHER PUBLICATIONS

R3-160947 3GPP TR 38.801 V0.1.0 (Mar. 2016), 3rd Generation Partnership Project; Technical Specification Group Radio Access Network; Study on New Radio Access Technology;Radio Access Architecture and Interfaces (Release 14), 18 pages.

(Continued)

*Primary Examiner* — Min Jung
(74) *Attorney, Agent, or Firm* — Slater Matsil, LLP

(57) ABSTRACT

This application provides a base station function deployment method and device. The base station includes at least a first radio center system RCS and a first radio remote system RRS. The method includes: obtaining a selected split manner that matches an available transmission resource between the first RRS and the first RCS, where the selected split manner is used to split functions of the base station into a first function group and a second function group; and deploying, on the first RCS, a base station function that is included in the first function group and that is determined based on the selected split manner, and deploying, on the first RRS, a base station function that is included in the second function group and that is determined based on the selected split manner.

18 Claims, 3 Drawing Sheets

(51) Int. Cl.
*H04W 48/18* (2009.01)
*H04W 72/04* (2009.01)
*H04W 80/08* (2009.01)

(56) References Cited

U.S. PATENT DOCUMENTS

| | | | |
|---|---|---|---|
| 2015/0141032 A1 | 5/2015 | Aydin et al. | |
| 2017/0367141 A1* | 12/2017 | Nagasaka | H04W 76/16 |
| 2017/0373890 A1* | 12/2017 | Fertonani | H04L 27/0002 |
| 2018/0124647 A1 | 5/2018 | Dai et al. | |
| 2018/0324780 A1* | 11/2018 | Novlan | H04L 43/0811 |
| 2019/0075560 A1* | 3/2019 | Takiguchi | H04W 72/04 |
| 2019/0124648 A1* | 4/2019 | Sun | H04W 28/08 |
| 2020/0084808 A1* | 3/2020 | Oak | H04L 69/321 |

FOREIGN PATENT DOCUMENTS

| | | |
|---|---|---|
| CN | 103582054 A | 2/2014 |
| CN | 103856953 A | 6/2014 |
| CN | 106332048 A | 1/2017 |
| WO | 2013076900 A1 | 5/2013 |
| WO | 2014180339 A1 | 11/2014 |
| WO | 2016002166 A1 | 1/2016 |

OTHER PUBLICATIONS

R3-161219 ZTE, "The peak bitrate requirement for different split options", 3GPP TSG RAN WG3 #92, Nanjing, China, May 23 27, 2016, 12 pages.

ZTE, "The peak bitrate requirement for different split options", 3GPP TSG RAN WG3 Meeting #93 R3-161785, Aug. 22-26, 2016, 12 pages, Gothenburg, Sweden.

Nokia, Alcatel-Lucent Shanghai Bell, "TP of Clean up for functional split", 3GPP TSG RAN WG3 #95 R3-170416, Feb. 13-17, 2017, 13 pages, Athens, Greece.

Maeder, A. et al., "A Scalable and Flexible Radio Access Network Architecture for Fifth Generation Mobile Networks", Nov. 1, 2016, pp. 16-23.

* cited by examiner

BASE STATION FUNCTION DEPLOYMENT METHOD AND DEVICE

CROSS-REFERENCE TO RELATED APPLICATIONS

This application is a continuation of International Application No. PCT/CN2017/079707, filed on Apr. 7, 2017, the disclosure of which is hereby incorporated by reference in its entirety.

TECHNICAL FIELD

This application relates to the wireless communications field, and in particular, to a device function deployment method and device.

BACKGROUND

In a wireless communications system, a distributed base station usually includes two parts: a baseband unit (BBU) and a remote radio unit (RRU). The BBU is configured to deploy a transport module (TRP) function, a radio resource control (RRC) function, a packet data convergence protocol (PDCP) function, a radio link control (RLC) function, a media access control (MAC) function, a physical layer (PHY) function (including a PHY-H function and a PHY-L function), and the like. The RRU may be configured to deploy an intermediate and radio frequency (IRF) function. Data may be transmitted between the BBU and the RRU by using a common public radio interface (CPRI).

Because the data is transmitted between the BBU and the RRU by using the CPRI, during base station deployment, a corresponding transmission resource needs to be configured for the CPRI based on a data transmission requirement between the BBU and the RRU, and the transmission resource may be light rays of different data transmission bandwidths. In actual use, to ensure data transmission between the BBU and the RRU, the corresponding transmission resource needs to be configured for the CPRI based on a maximum transmission requirement between the BBU and the RRU. If a transmission resource configured for the CPRI during base station deployment is greater than a transmission resource actually required by the CPRI, a severe transmission resource waste is caused; or if a transmission resource configured for the CPRI during base station deployment is smaller than a transmission resource actually required by the CPRI, service performance of the base station is affected due to an insufficient transmission resource.

SUMMARY

This application provides a base station function deployment method and device, to avoid a waste or insufficiency of a transmission resource.

According to a first aspect, this application provides a base station function deployment method, where a base station includes at least a first radio center system RCS and a first radio remote system RRS, and the method includes: obtaining a selected split manner that matches an available transmission resource between the first RRS and the first RCS, where the selected split manner is used to split functions of the base station into a first function group and a second function group, a computing resource that needs to be occupied by function included in the second function group is not greater than the available computing resource, a transmission resource that needs to be occupied by data transmission between the first function group and the second function group is not greater than the available transmission resource, and the available computing resource is a computing resource that is in the first RRS and that is allocated for processing a base station function; and deploying, on the first RCS, a base station function that is included in the first function group and that is determined based on the selected split manner, and deploying, on the first RRS, a base station function that is included in the second function group and that is determined based on the selected split manner.

By using this implementation, how to deploy a base station function may be determined based on a size of the available transmission resource. This can avoid a waste or insufficiency of a transmission resource caused by a deployment manner in which a transmission resource is allocated after the base station function is deployed.

With reference to the first aspect, in a first possible implementation of the first aspect, the obtaining a selected split manner that matches an available transmission resource between the first RRS and the first RCS includes: periodically obtaining a selected split manner that matches an available transmission resource between the first RRS and the first RCS; or when air interface load of the first RRS changes, obtaining a selected split manner that matches an available transmission resource between the first RRS and the first RCS; or when the available transmission resource changes, obtaining a selected split manner that matches an available transmission resource between the first RRS and the first RCS.

With reference to the first aspect, in a second possible implementation of the first aspect, the first function group includes an RRC function and a PDCP function, and the second function group includes an RLC function, a MAC function, a PHY function, and an IRF function.

With reference to the first possible implementation of the first aspect, in a third possible implementation of the first aspect, the first function group includes an RRC function and a PDCP function, and the second function group includes an RLC function, a MAC function, a PHY function, and an IRF function.

With reference to any one of the first aspect or the first to the third possible implementations of the first aspect, in a fourth possible implementation of the first aspect, the base station further includes a second RRS; and the method further includes: deploying the base station function included in the second function group on the second RRS.

With reference to any one of the first aspect or the first to the fourth possible implementations of the first aspect, in a fifth possible implementation of the first aspect, the base station includes at least two RCSs; and before the obtaining a selected split manner that matches an available transmission resource between the first RRS and the first RCS, the method further includes: determining the first RCS, where the first RCS is an RCS that is of the at least two RCSs and that has a greatest available transmission resource with the first RRS.

According to a second aspect, this application further provides a base station function deployment device, and the deployment device includes unit modules such as an obtaining unit and a processing unit that are configured to perform steps in the method according to the first aspect or the implementations of the first aspect. The unit modules may be implemented by a processor in the deployment device by controlling a memory or a communications interface.

According to a third aspect, this application further provides a base station, and the base station includes at least one RCS and at least one RRS. Either the at least one RRS or the at least one RCS may be configured to perform the base station function deployment method according to the first aspect or the implementations of the first aspect.

According to a fourth aspect, this application further provides a computer readable storage medium. The computer readable storage medium stores an instruction, and when the instruction is executed on a computer, the computer is enabled to perform the method according to the first aspect or the implementations of the first aspect.

According to a fifth aspect, this application further provides a computer program product including an instruction, where when the computer program product runs on a computer, the computer is enabled to perform the method according to the first aspect.

According to the method, the device, and the like provided in this application, the split manner may be selected based on the available transmission resource, so that a transmission resource can be fully used. Therefore, a transmission resource waste may be reduced, avoiding a case in which service performance of the base station is affected due to an insufficient transmission resource.

BRIEF DESCRIPTION OF THE DRAWINGS

To describe the technical solutions in this application more clearly, the following briefly describes the accompanying drawings required for describing the embodiments. Apparently, a person of ordinary skill in the art may derive other drawings from these accompanying drawings without creative efforts.

DETAILED DESCRIPTION OF ILLUSTRATIVE EMBODIMENTS

Figure 1:
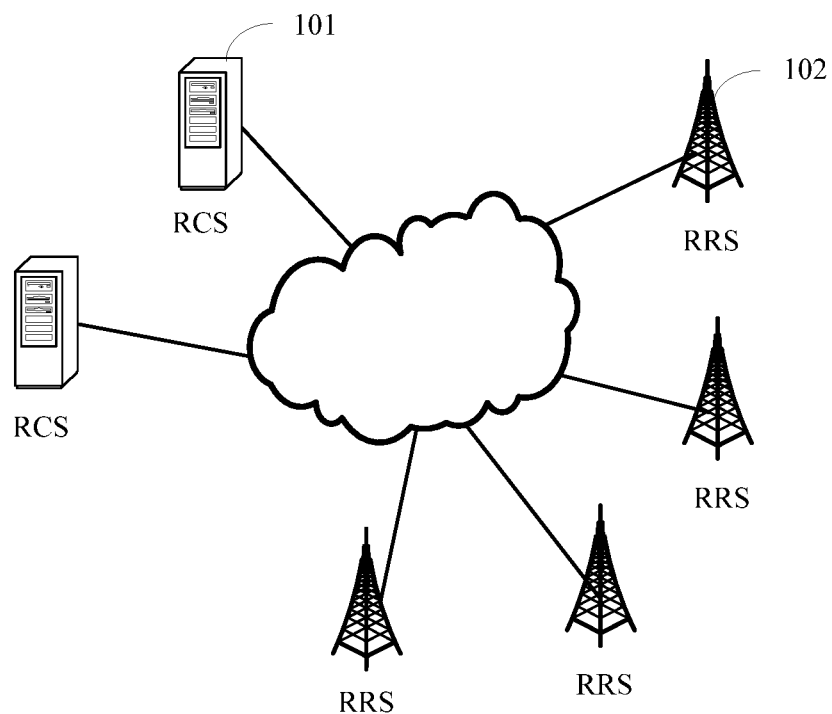
FIG. 1 is a schematic structural diagram of a base station according to this application.

In the embodiments of this application, a base station may include at least one radio center system (RCS) and at least one radio remote system (RRS), and data may be transmitted between the RRS and the RCS by using a medium such as an optical cable. For example, as shown in FIG. 1, the base station may include at least a first RCS 101 and a first RRS 102.

Figure 2:
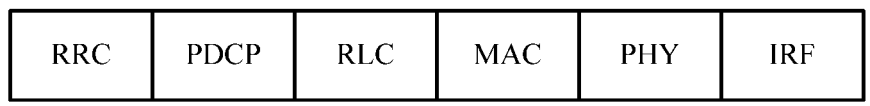
FIG. 2 is a schematic diagram of a logical relationship between base station functions according to this application.

Base station functions that need to be deployed on the base station may include a radio resource control (RRC) function, a packet data convergence protocol (PDCP) function, a radio link layer control protocol (RLC) function, a media access control (MAC) function, a physical layer (PHY) function, an IRF function, and the like. The PHY function may be further split into a PHY-H function and a PHY-L function. A logical relationship between the base station functions may be shown in FIG. 2. Based on different actual usage requirements, the base station functions may be split into a first function group and a second function group in different split manners such as S1, I10, I8, I6, I4, Ie, or I1. A base station function included in the first function group is deployed on the RCS, and a base station function included in the second function group is deployed on the RRS. When the base station functions are split into the first function group and the second function group, a farther distance between a split point and the IRF function indicates that the base station function deployed on the RRS requires a greater computing resource, and correspondingly, data transmission between the RRS and the RCS requires a smaller data transmission resource. In addition, when the base station includes a plurality of RRSs, a closer distance between the split point and the IRF function leads to better coordination between the RRSs.

Figure 3:
FIG. 3 is a schematic diagram of a logical relationship of a base station function split manner according to this application.
Figure 4:
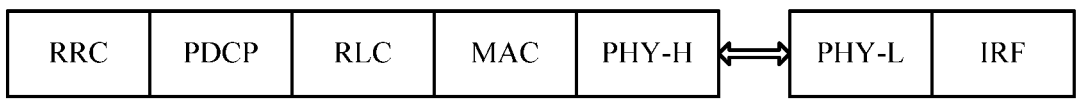
FIG. 4 is a schematic diagram of a logical relationship of another base station function split manner according to this application.
Figure 5:
FIG. 5 is a schematic diagram of a logical relationship of still another base station function split manner according to this application.
Figure 6:
FIG. 6 is a schematic diagram of a logical relationship of yet another base station function split manner according to this application.

As shown in FIG. 3, if an I1 split is performed on the base station, the first function group may include the RRC function, the PDCP function, the RLC function, the MAC function, and the PHY function, and the second function group may include the IRF function. As shown in FIG. 4, if an I4 or Ie split is performed on the base station, the first function group may include the RRC function, the PDCP function, the RLC function, the MAC function, and the PHY-H function, and the second function group may include the PHY-L function and the IRF function. As shown in FIG. 5, if an I6 split is performed on the base station, the first function group may include the RRC function, the PDCP function, the RLC function, and the MAC function, and the second function group may include the PHY function and the IRF function. As shown in FIG. 6, if an I8 split is performed on the base station, the first function group may include the RRC function and the PDCP function, and the second function group may include the RLC function, the MAC function, the PHY function, and the IRF function. Other split manners are not listed herein one by one.

Based on a relationship between a split point and a hybrid automatic repeat request (hybrid automatic repeat request, HARQ) loop, the split manners may be classified into a HARQ in-loop split and a HARQ out-of-loop split. HARQ in-loop splits such as I6, I4, Ie, and I1 splits have relatively good transport networking and coordination features when the base station includes two or more RRSs. Therefore, the base station functions may usually be split into two function groups by using a HARQ in-loop split.

Figure 7:
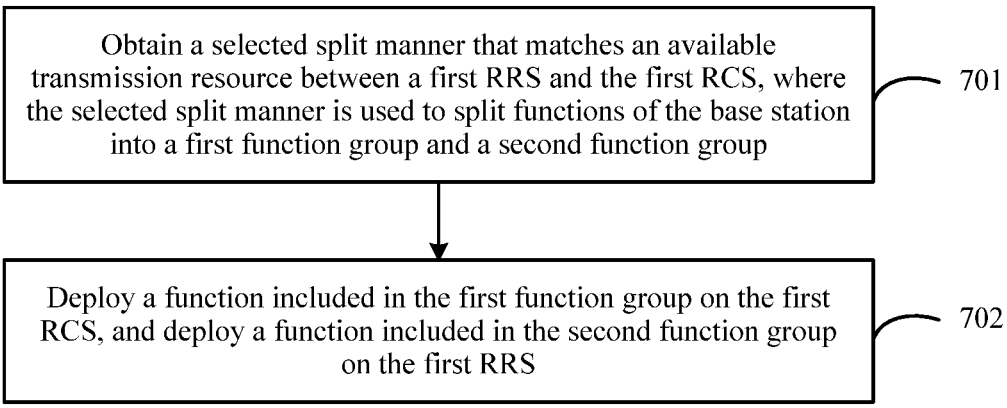
FIG. 7 is a schematic flowchart of an embodiment of a base station function deployment method according to this application.

FIG. 7 is a schematic flowchart of an embodiment of a base station function deployment method according to this application. The method described in this embodiment may be performed by any RCS or any RRS in a base station, may be performed by another device in a base station except an RRS and an RCS, or may be performed by another device other than a base station. For ease of description, an RCS, an RRS, and other devices configured to perform the embodiments of this application are collectively referred to as a deployment device in the following embodiments.

Step 701: Obtain a selected split manner that matches an available transmission resource between a first RRS and a first RCS, where the selected split manner is used to split functions of the base station into a first function group and a second function group.

That the selected split manner matches the available transmission resource may be that, when the base station is split in the selected split manner, a transmission resource that needs to be occupied by data transmission between the first function group and the second function group is not greater than the available transmission resource.

Generally, that the selected split manner matches the available transmission resource may be that, after the functions of the base station are split into the first function group and the second function group in the selected split manner, the transmission resource required by the data transmission between the first function group and the second function group is not less than a first preset value and is not greater than a second preset value. Both the first preset value and the second preset value may be set as required, and the second preset value is greater than the first preset value.

Based on different actual application scenarios, the selected split manner may further need to meet another constraint in addition to matching the available transmission resource. For example, generally, the another constraint that further needs to be met is as follows: A computing resource that needs to be occupied by a function included in the second function group further needs to be not greater than the available computing resource. The available computing resource is a computing resource that is in the first RRS and that is allocated for processing a base station function. When an overall computing resource of the RRS is fixed, the available computing resource is smaller when a greater computing resource is allocated to an air interface service, and the available computing resource is greater when a smaller computing resource is allocated to the air interface service.

Therefore, during base station function deployment, the deployment device may select the selected split manner with reference to the another constraint based on the available transmission resource between the first RRS and the first RCS.

For example, during initial base station deployment, because an available transmission resource is relatively small and air interface load of the RRS is relatively low, the deployment device may select an I8 split as the selected split manner without considering coordination between a plurality of RRSs. When the I8 split is used, the first function group includes an RRC function and a PDCP function, and the second function group includes an RLC function, a MAC function, a PHY function, and an IRF function. When the I8 split is used as the selected split manner, data transmission between the RRS and the RCS requires a relatively small resource. Therefore, both a computing resource requirement of the RRS and the requirement of the data transmission between the RRS and the RCS may be considered. If a plurality of RRSs need to be coordinated, the deployment device may alternatively select an I6 split as the selected split manner.

After the initial base station deployment is completed, the deployment device may further redeploy the functions of the base station as required.

The deployment device may periodically obtain a selected split manner that matches an available transmission resource between the first RRS and the first RCS, to periodically redeploy the base station functions. Alternatively, after the air interface load of the first RRS changes or the available transmission resource changes, the deployment device may obtain a selected split manner that matches an available transmission resource between the first RRS and the first RCS, to conditionally redeploy the base station functions.

For example, when the base station needs to serve more terminals, air interface load of the base station increases. However, higher air interface load results in a smaller available computing resource of the first RRS. When the air interface load of the base station increases, to meet a requirement of the air interface service, the base station functions need to be redeployed.

During base station redeployment, if the available transmission resource is greater than a first transmission threshold and is not greater than a second transmission threshold, the deployment device may use the I6 split as the selected split manner. Therefore, the first function group includes the RRC function, the PDCP function, the RLC function, and the MAC function, and the second function group includes the PHY function and the IRF function. For example, the first transmission threshold may be 25 G, and the second transmission threshold may be 40 G. Using the I6 split as the selected split manner can reduce a computing resource requirement of the second function group, so that a greater computing resource in the RRS is allocated to the air interface service.

Alternatively, if the available transmission resource is greater than the second transmission threshold, an $I_4$/Ie split may be used as the selected split manner. Therefore, the first function group includes the RRC function, the PDCP function, the RLC function, and the MAC function, and the second function group includes the PHY function and the IRF function. For example, the first transmission threshold may be 25 G, and the second transmission threshold may be 40 G. When the available transmission resource is sufficient, using the $I_4$/Ie split as the selected split manner can reduce a computing resource requirement of the second function group, so that a greater computing resource in the RRS is allocated to the air interface service, thereby reducing an RRS upgrade requirement.

Alternatively, if the available transmission resource is more than sufficient, for example, if the available transmission resource is greater than a third transmission threshold, an $I_1$ split may be used as the selected split manner. Therefore, the first function group includes the RRC function, the PDCP function, the RLC function, the MAC function, and the PHY function, and the second function group includes the IRF function. For example, the third transmission threshold may be 100 G.

When the base station includes a plurality of RRSs, to ensure cooperation between the RRSs, a same base station function may be deployed on all the RRSs. For example, when the base station further includes a second RRS, the base station function included in the second function group may also be deployed on the second RRS. The base station function deployed on the first RRS is consistent with the base station function deployed on the second RRS. If the selected split manner is a HARQ in-loop split, a favorable condition may be created for coordination between the second RRS and the first RRS.

In actual use, in addition to the first RCS, the base station may further include a plurality of RCSs such as a second RCS. Therefore, before obtaining the split manner, the deployment device may further first determine an RCS that is of the RCSs included in the base station and that is used as the first RCS serving the first RRS. Usually, an RCS having a greatest available transmission resource with the first RRS may be selected as the first RCS.

Step 702: Deploy a base station function included in the first function group on the first RCS, and deploy a base station function included in the second function group on the first RRS.

After the selected split manner is obtained, the base station function included in the first function group and the base station function included in the second function group are determined accordingly. After both the base station function included in the first function group and the base station function included in the second function group are determined, the deployment device may deploy the base station function included in the first function group on the RCS, and deploy the base station function included in the second function group on the RRS.

Corresponding to the base station function deployment method in this application, this application further provides a base station function deployment device.

Figure 8:
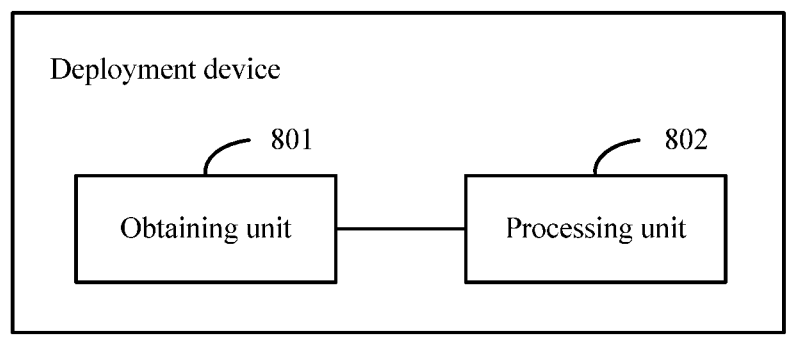
FIG. 8 is a schematic structural diagram of an embodiment of a base station function deployment device according to this application.

FIG. 8 is a schematic structural diagram of an embodiment of a base station function deployment device according to this application. The deployment device may be disposed in an RCS or an RRS, may be disposed in another device, or may be the RRS or the RCS.

As shown in FIG. 8, the deployment device may include an obtaining unit 801 and a processing unit 802.

The obtaining unit 801 is configured to obtain a selected split manner that matches an available transmission resource between a first RRS and the first RCS, where the selected split manner is used to split functions of the base station into a first function group and a second function group, a computing resource that needs to be occupied by a function included in the second function group is not greater than the available computing resource, a transmission resource that needs to be occupied by data transmission between the first function group and the second function group is not greater than the available transmission resource, and the available computing resource is a computing resource that is in the first RRS and that is allocated for processing a base station function. The processing unit 802 is configured to: deploy, on the first RCS, a base station function that is included in the first function group and that is determined based on the selected split manner; and deploy, on the first RRS, a base station function that is included in the second function group and that is determined based on the selected split manner.

The obtaining unit 801 may be further configured to: periodically obtain a selected split manner that matches an available transmission resource between the first RRS and the first RCS; or when air interface load of the first RRS changes, obtain a selected split manner that matches an available transmission resource between the first RRS and the first RCS; or when the available transmission resource changes, obtain a selected split manner that matches an available transmission resource between the first RRS and the first RCS.

Optionally, the first function group includes an RRC function and a PDCP function, and the second function group includes an RLC function, a MAC function, a PHY function, and an IRF function.

Optionally, if the available transmission resource is greater than a first transmission threshold and is not greater than a second transmission threshold, the first function group includes an RRC function, a PDCP function, an RLC function, and a MAC function, and the second function group includes a PHY function and an IRF function; or if the available transmission resource is greater than the second transmission threshold, the first function group includes the RRC function, the PDCP function, the RLC function, the MAC function, and a PHY-H function, and the second function group includes a PHY-L function and the IRF function.

The processing unit 802 is further configured to: when the base station further includes a second RRS, deploy the base station function included in the second function group on the second RRS.

The processing unit 802 is further configured to: when the base station includes at least two RCSs, determine the first RCS, where the first RCS is an RCS that is of the at least two RCSs and that has a greatest available transmission resource with the first RRS.

Figure 9:
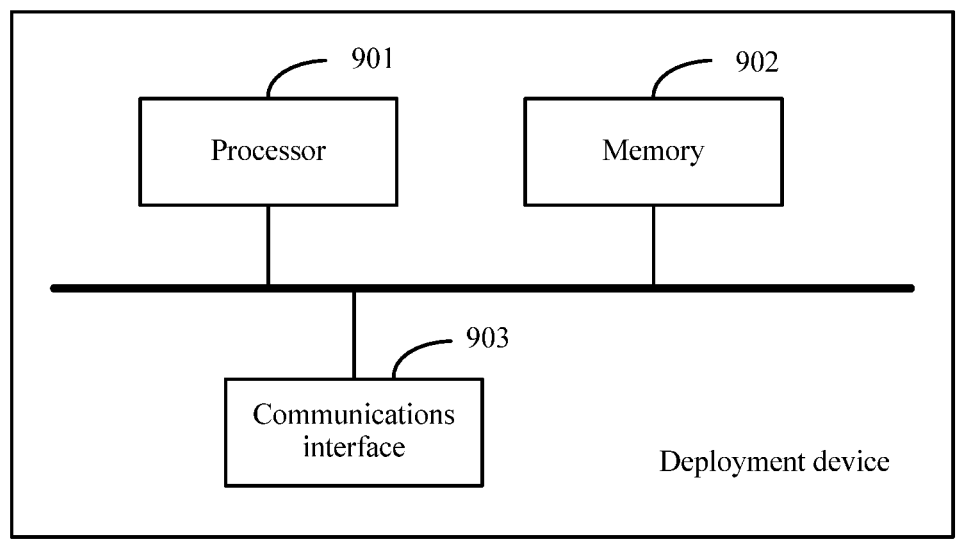
FIG. 9 is a schematic structural diagram of another embodiment of a base station function deployment device according to this application.

FIG. 9 is a schematic structural diagram of another embodiment of a base station function deployment device according to this application. The deployment device may be disposed in an RCS or an RRS, may be disposed in another device, or may be the RRS or the RCS.

As shown in FIG. 9, the deployment device may include a processor 901, a memory 902, and a communications interface 903.

As a control center of the deployment device, the processor 901 is connected to each part of the entire deployment device by using various interfaces and lines, and performs various functions of the deployment device and/or data processing by running or executing a software program and/or a module stored in the memory and invoking data stored in the memory. The processor may be a central processing unit (CPU for short), a network processor (NP for short), or a combination of a CPU and an NP. The processor may further include a hardware chip. The hardware chip may be an application-specific integrated circuit (ASIC for short), a programmable logic device (PLD for short), or a combination thereof. The PLD may be a complex programmable logical device (CPLD for short), a field-programmable gate array (FPGA for short), generic array logic (GAL for short), or any combination thereof.

The memory 902 may include a volatile memory (volatile memory), such as a random access memory (RAM for short); may include a nonvolatile memory (non-volatile memory), such as a flash memory (flash memory), a hard disk drive (HDD for short), or a solid state disk (SSD for short); or may include a combination of the foregoing types of memories. The memory may store a program or code, and a processor in a network element may implement a function of the network element by executing the program or the code.

The communications interface may be configured to implement communication between the device and another device. For example, when the deployment device is the RCS, the communications interface may be a common public radio interface (common public radio interface, CPRI) configured to implement communication between the RRS and the RCS.

The processor 901 may be configured to: obtain, from another device by using the communications interface 903 or from the memory 902, a selected split manner that matches an available transmission resource between a first RRS and the first RCS, where the selected split manner is used to split functions of the base station into a first function group and a second function group, a computing resource that needs to be occupied by a function included in the second function group is not greater than the available computing resource, a transmission resource that needs to be occupied by data transmission between the first function group and the second function group is not greater than the available transmission resource, and the available computing resource is a computing resource that is in the first RRS and that is allocated for processing a base station function; deploy, on the first RCS, a base station function that is included in the first function group and that is determined based on the selected split manner; and deploy, on the first RRS, a base station function that is included in the second function group and that is determined based on the selected split manner.

Optionally, the processor 901 may be configured to: periodically obtain a selected split manner that matches an available transmission resource between the first RRS and the first RCS; or when air interface load of the first RRS changes, obtain a selected split manner that matches an available transmission resource between the first RRS and the first RCS; or when the available transmission resource changes, obtain a selected split manner that matches an available transmission resource between the first RRS and the first RCS.

Optionally, the processor 901 may be further configured to deploy the base station function included in the second function group on a second RRS.

Optionally, the processor 901 may be further configured to determine the first RCS, where the first RCS is an RCS that is of the at least two RCSs and that has a greatest available transmission resource with the first RRS.

Corresponding to the foregoing method and device, this application further provides a base station. For example, as shown in FIG. 1, the base station may include at least one RCS and at least one RRS.

In an implementation, at least one of the at least one RCS may be configured to perform the method in the foregoing embodiment, or is provided with the device in the foregoing embodiments. In another implementation, at least one of the at least one RRS may be configured to perform the method in the foregoing embodiment, or is provided with the device in the foregoing embodiments.

All or some of the foregoing embodiments may be implemented through software, hardware, firmware, or any combination thereof. When the software is used to implement the embodiments, the embodiments may be implemented partially or completely in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or other programmable apparatuses. The computer instructions may be stored in a computer readable storage medium, or may be transmitted from one computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line DSL) or wireless (for example, infrared, radio, and microwave) manner. The computer readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid state drive SSD), or the like.

The foregoing implementations of this application constitute no limitation on the protection scope of this application.

What is claimed is:

1. A method comprising:
obtaining, by a device, a selected split manner corresponding to an available transmission resource between a first radio remote system (RRS) and a first radio center system (RCS), wherein a base station comprises the first RCS and the first RRS, the selected split manner specifies functions of the base station belonging to a first function group and a second function group, wherein a computing resource requirement of a base station function comprised in the second function group is not greater than an available computing resource in the first RRS, and a transmission resource requirement of data transmission between the first function group and the second function group is not greater than the available transmission resource between the first RCS and the first RRS;
deploying, on the first RCS, by the device, a base station function included in the first function group and determined according to the selected split manner; and
deploying, on the first RRS, by the device, a base station function that is included in the second function group and determined according to the selected split manner.

2. The method according to claim 1, wherein obtaining the selected split manner corresponding to the available transmission resource between the first RRS and the first RCS comprises:
obtaining, periodically, the selected split manner corresponding to the available transmission resource between the first RRS and the first RCS;
obtaining, based on an air interface load of the first RRS changing, the selected split manner corresponding to the available transmission resource between the first RRS and the first RCS; or
obtaining, based on the available transmission resource changing, the selected split manner corresponding to the available transmission resource between the first RRS and the first RCS.

3. The method according to claim 1, wherein:
the first function group comprises a radio resource control (RRC) function and a packet data convergence protocol (PDCP) function, and the second function group comprises an radio link control (RLC) function, a media access control (MAC) function, a physical layer (PHY) function, and an intermediate and radio frequency (IRF) function.

4. The method according to claim 1, wherein the method further includes:
determining, according to the available transmission resource being greater than a first transmission threshold and not being greater than a second transmission threshold, the first function group includes an RRC function, a PDCP function, an RLC function, and a MAC function, and the second function group includes a PHY function and an IRF function; and
determining, according to the available transmission resource being greater than the second transmission threshold, the first function group includes the RRC function, the PDCP function, the RLC function, the MAC function, and a PHY-H function, and the second function group includes a PHY-L function and the IRF function.

5. The method according to claim 1, wherein the base station further comprises a second RRS; and
the method further comprises: deploying, by the device, the base station function comprised in the second function group on the second RRS.

6. The method according to claim 1, wherein the base station comprises at least two RCSs; and
the method further comprises:
determining, before obtaining the selected split manner corresponding to the available transmission resource between the first RRS and the first RCS, the first RCS, wherein the first RCS is an RCS of the at least two RCS's that has a greatest available transmission resource with the first RRS.

7. A device comprising:
a processor; and
a non-transitory computer-readable storage medium storing a program to be executed by the processor, the program including instructions for:
obtaining a selected split manner corresponding to an available transmission resource between a first radio remote system (RRS) and a first radio center system (RCS), wherein a base station comprises the first RCS and the first RRS, the selected split manner specifies functions of the base station belonging to a first function group and a second function group, wherein a computing resource requirement of a base station function comprised in the second function group is not greater than an available computing resource in the first RRS, and a transmission resource requirement of data transmission between the first function group and the second function group is not greater than the available transmission resource between the first RCS and the first RRS;
deploying, on the first RCS, a base station function included in the first function group and determined according to the selected split manner; and
deploying, on the first RRS, a base station function that is included in the second function group and determined according to the selected split manner.

8. The device according to claim 7, wherein the program includes further instructions for:
obtaining, periodically, the selected split manner corresponding to the available transmission resource between the first RRS and the first RCS;
obtaining, based on an air interface load of the first RRS changing, the selected split manner corresponding to the available transmission resource between the first RRS and the first RCS; or
obtaining, based on the available transmission resource changing, the selected split manner corresponding to the available transmission resource between the first RRS and the first RCS.

9. The device according to claim 7, wherein:
the first function group includes a radio resource control (RRC) function and a packet data convergence protocol (PDCP) function, and the second function group includes radio link control (RLC) function, a media access control (MAC) function, a physical layer (PHY) function, and an intermediate and radio frequency (IRF) function.

10. The device according to claim 7, wherein the program further includes instructions for:
determining, according to the available transmission resource being greater than a first transmission threshold and not being greater than a second transmission threshold, the first function group includes an RRC function, a PDCP function, an RLC function, and a MAC function, and the second function group includes a PHY function and an IRF function; and
determining, according to the available transmission resource being greater than the second transmission threshold, the first function group comprises includes the RRC function, the PDCP function, the RLC function, the MAC function, and a PHY-H function, and the second function group includes a PHY-L function and the IRF function.

11. The device according to claim 7, wherein the program includes further instructions for:
deploying, based on the base station further including a second RRS, the base station function comprised in the second function group on the second RRS.

12. The device according to claim 7, wherein the program includes further instructions for:
determining, based on the base station including at least two RCSs, the first RCS, wherein the first RCS is an RCS of the at least two RCSs that has a greatest available transmission resource with the first RRS.

13. A non-transitory computer readable storage medium, comprising a program including instructions executable by a processor, wherein when the program is executed on a device having a processor, the device is enabled to perform:
obtaining a selected split manner corresponding to an available transmission resource between a first radio center system (RRS) and a first radio remote system (RCS), wherein the first RRS and the first RCS are comprised in a base station, and wherein the selected split manner specifies functions of the base station belonging to a first function group and a second function group, wherein a computing resource requirement of a base station function comprised in the second function group is not greater than an available computing resource in the first RRS, and a transmission resource requirement of data transmission between the first function group and the second function group is not greater than the available transmission resource between the first RCS and the first RRS; and
deploying, on the first RCS, a base station function included in the first function group and determined according to the selected split manner; and
deploying, on the first RRS, a base station function included in the second function group and determined according to the selected split manner.

14. The non-transitory computer readable storage medium according to claim 13, wherein obtaining the selected split manner corresponding to the available transmission resource between the first RRS and the first RCS comprises:
obtaining, periodically, the selected split manner corresponding to the available transmission resource between the first RRS and the first RCS;
obtaining, based on an air interface load of the first RRS changing, the selected split manner corresponding to the available transmission resource between the first RRS and the first RCS; or
obtaining, based on the available transmission resource changing, the selected split manner corresponding to the available transmission resource between the first RRS and the first RCS.

15. The non-transitory computer readable storage medium according to claim 13, wherein
the first function group comprises a radio resource control (RRC) function and a packet data convergence protocol (PDCP) function, and the second function group comprises an radio link control (RLC) function, a media access control (MAC) function, a physical layer (PHY) function, and an intermediate and radio frequency (IRF) function.

16. The non-transitory computer readable storage medium according to claim 13, wherein:

determining, according to the available transmission resource being greater than a first transmission threshold and not being greater than a second transmission threshold, the first function group includes an RRC function, a PDCP function, an RLC function, and a MAC function, and the second function group includes a PHY function and an IRF function; and determining, according to the available transmission resource being greater than the second transmission threshold, the first function group includes the RRC function, the PDCP function, the RLC function, the MAC function, and a PHY-H function, and the second function group includes a PHY-L function and the IRF function.

17. The non-transitory computer readable storage medium according to claim 13, wherein the base station further comprises a second RRS; and the program further includes instructions for deploying the base station function comprised in the second function group on the second RRS.

18. The non-transitory computer readable storage medium according to claim 13, wherein the base station comprises at least two RCSs, and the program further includes instructions for determining, before obtaining the selected split manner corresponding to the available transmission resource between the first RRS and the first RCS, the first RCS, wherein the first RCS is an RCS of the at least two RCS's that has a greatest available transmission resource with the first RRS.

\* \* \* \* \*

UNITED STATES PATENT AND TRADEMARK OFFICE
CERTIFICATE OF CORRECTION

PATENT NO. : 11,109,450 B2
APPLICATION NO. : 16/593780
DATED : August 31, 2021
INVENTOR(S) : Haidong Xu et al.

It is certified that error appears in the above-identified patent and that said Letters Patent is hereby corrected as shown below:

In the Claims

Claim 10, Column 12, Line 1; delete "comprises".

Signed and Sealed this
Fifth Day of July, 2022

Katherine Kelly Vidal
*Director of the United States Patent and Trademark Office*